(12) United States Patent
Li (10) Patent No.: US 6,477,289 B1
(45) Date of Patent: Nov. 5, 2002

(54) OPTICAL WEDGE SWITCH

(75) Inventor: Yiqiang Li, Milpitas, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/511,695

(22) Filed: Feb. 23, 2000

(51) Int. Cl.[7] .............................. G02B 6/34; G02B 6/35
(52) U.S. Cl. .............................. 385/16; 385/25; 385/36; 359/837
(58) Field of Search .................... 385/16, 20–25, 385/31, 36; 359/831, 837

(56) References Cited

U.S. PATENT DOCUMENTS

| | | | |
|---|---|---|---|
| 3,479,107 A | 11/1969 | Blythe et al. .................. 350/6 |
| 4,303,303 A | 12/1981 | Aoyama ..................... 350/96.2 |
| 4,497,465 A | 2/1985 | Yeakley et al. ............. 248/466 |
| 4,634,239 A * | 1/1987 | Buhrer ........................ 385/17 |
| 4,790,621 A | 12/1988 | Calaby et al. ............. 350/96.2 |
| 4,802,720 A | 2/1989 | Paulsen ....................... 350/6.6 |
| 4,893,891 A | 1/1990 | Fujita et al. .............. 350/96.2 |
| 4,997,123 A | 3/1991 | Backus et al. .............. 228/182 |
| 5,321,774 A | 6/1994 | Barnard et al. ............... 385/16 |
| 5,594,820 A | 1/1997 | Garel-Jones et al. .......... 385/22 |
| 5,620,169 A | 4/1997 | Payne ........................ 267/160 |
| 5,675,683 A | 10/1997 | Takahashi ..................... 385/78 |
| 5,682,452 A | 10/1997 | Takahashi ..................... 385/85 |
| 5,742,712 A | 4/1998 | Pan et al. ..................... 385/18 |
| 5,796,889 A | 8/1998 | Xu et al. ...................... 385/24 |
| 5,838,847 A | 11/1998 | Pan et al. ..................... 385/18 |
| 5,867,617 A | 2/1999 | Pan et al. ..................... 385/18 |
| 5,940,553 A | 8/1999 | Murakami et al. ............. 385/22 |
| 5,956,411 A | 9/1999 | Fairchild et al. .............. 385/27 |
| 5,959,756 A | 9/1999 | Keyworth et al. ........... 359/196 |
| 5,999,669 A | 12/1999 | Pan et al. ..................... 385/18 |
| 6,154,585 A | 11/2000 | Copner et al. ................ 385/16 |
| 6,215,919 B1 | 4/2001 | Li et al. ....................... 385/16 |
| 6,292,604 B1 * | 9/2001 | Cheng ......................... 385/24 |
| 6,415,067 B1 | 7/2002 | Copner et al. ................ 385/16 |
| 2001/0006568 A1 * | 7/2001 | Copner et al. ................ 385/16 |

FOREIGN PATENT DOCUMENTS

| | | | |
|---|---|---|---|
| EP | 0 437 040 A2 | 7/1991 | ............ G02B/6/28 |
| WO | WO 92/20002 | * 11/1992 | ............ G02B/26/02 |

* cited by examiner

Primary Examiner—John D. Lee
Assistant Examiner—Sarah U Song
(74) Attorney, Agent, or Firm—Scott Hewlett (57) ABSTRACT

An optical switch using a refractive optical element (52) to direct a light beam in selected directions upon operation of the switch. In a preferred embodiment, the refractive optical element is an optical wedge having a first portion (67) that transmits a light beam in a selected direction, and a second portion (50) that transmits the light beam in another direction, when the first or second portions of the optical wedge are switched into the path of the light beam. The refractive optical element is less sensitive to misalignment than a reflective element, for example. In a further embodiment, the optical wedge is combined with wavelength-selective filters (118, 128) and other components to provide a channel DROP and/or ADD function with high isolation.

13 Claims, 6 Drawing Sheets

OPTICAL WEDGE SWITCH

CROSS-REFERENCE TO RELATED APPLICATIONS

The present application is being concurrently filed with co-assigned U.S. patent application Ser. No. 09/511,693, now U.S. Pat. No. 6,389,188 entitled HYBRID WAVELENGTH SELECTIVE OPTICAL ROUTER AND SWITCH by Michael A. Scobey and Robert W. Hallock, the disclosure of which is incorporated herein for all purposes.

STATEMENT REGARDING FEDERALLY SPONSORED RESEARCH OR DEVELOPMENT

Not applicable.

REFERENCE TO MICROFICHE APPENDIX

Not applicable.

1. Field of the Invention

The present invention is generally related to switches for use in optical fiber networks, and in particular provides an optical switch that switches an optical wedge in an optical signal path.

2. Background of the Invention

Optical fiber networks are used in a variety of applications, such as optical communication and data transmission systems. Optical fibers are generally very thin (e.g. 2–10 microns in diameter) glass fibers that have a core and a cladding that act as a waveguide for light signals. The light signals propagate down the fiber from one location to another, analogous to electrical signals traveling down a wire or cable from one location to another. However, light signals are different from electrical signals in a number of ways. For example, it is relatively simple to couple an electrical signal on one wire to another wire by simply joining the wires. Light signals traveling down an optical fiber, however, must be accurately directed or otherwise coupled to another fiber or device. Thus, switching light signals from one fiber to another frequently requires accurate mechanical alignment.

Several types of electromechanical switches have been developed to switch light signals from one fiber to another. One type of switch moves the ends of an input optical fiber relative to the ends of output optical fibers. Such methods rely on the accurate alignment of one fiber to another. However, the thin fibers are also delicate and subject to breakage if not reinforced, which adds undesirable stiffness to the fiber.

Another type of optical switch uses a mirror, such as a front-surface mirror or other reflective element, mounted on an arm or pole. The mirror is moved into and out of a light signal path from an input fiber. When the mirror is in the light signal path, it reflects the light signal to one output path, and when the mirror is removed from the light signal path, the light signal travels to another output path. Thus, optical switching is achieved by moving the mirror in and out of the light signal path, without moving the optical fibers. However, misalignment in the plane of the mirror typically results in a doubling of the error in the reflected beam. This not only necessitates precise alignment when the switch is assembled, but is also a consideration when designing the switch for shock load.

Additionally, in some configurations the beam is an arm moved by a relay. The arm is relatively long compared to either the dimensions of the mirror or the travel of the mirror, and it is generally desirable to keep the mass of the arm and mirror assembly low to facilitate the mechanical operation of the switch. Unfortunately, a lightweight arm is generally not as strong or as stiff as a heavier arm of similar materials and construction. If the switch is subjected to vibration that causes the mirror to rotate with respect to the input light beam, it is possible that the output beam from the mirror is moving twice the rotational angle of the mirror. A similar problem can arise from mechanical, thermal, or other distortions of the placement of the mirror.

Thus, it is desirable to provide an optical switch that is easier to align during fabrication, is more environmentally stable, less susceptible to shock and vibration, and is more reliable than conventional switches. It is also desirable that the optical switch be compact, and switch the light signal from one path to another with minimal signal loss.

SUMMARY OF THE INVENTION

The present invention provides improved optical switches with reduced sensitivity to linear and angular misalignment, shock, and vibration. A refractive, rather than reflective, optical element is switched between positions in a light signal path. The refractive optical element could be an optical wedge, for example, with two regions, each with different refractive properties. The switched optical wedge element produces less undesired deflection of the light beam resulting from shock, vibration, or misalignment compared to a reflective element, such as a mirror, particularly in a rotation of the element with respect to the incident light beam. Collimating lenses are typically used to expand the light signal from an input fiber, and to focus the light signal onto the end of an output signal fiber. "Input" and "output" are used as terms of convenience for purposes of illustration only, those skilled in the art will appreciate the reciprocal nature of the optical switches.

In a particular embodiment an optical wedge is mounted on a switch mechanism, such as a hinged or elastic beam, armature, or slide, that is moved by an actuator, such as a solenoid, piezoelectric device, or other transducer. The optic wedge is mounted so that a face of the optic wedge is essentially normal to a light signal from an optical input. A second face of the optic wedge has a first portion that is essentially parallel to the first face, and a second portion that is angled to the first face, i.e. not parallel. In a first switch position, the light signal passes through the first face and the first portion of the second face to be transmitted with refraction of essentially zero degrees. In the second switch position, the light signal passes through the first face and the second portion of the second face to be refracted in a selected direction. Thus, the switch can direct the light signal to a first output port in the first position and to a second output port in the second position.

In a further embodiment, a wavelength-selective filter is placed between the input and the refractive element. The filter transmits, or "drops", selected wavelength of the input light signal, typically one or more channels defined according to an optical network transmission protocol, and reflects the remainder of the input light signal to an optical waveguide, such as an optical fiber. Thus, this embodiment allows a selected channel(s) to be switched between outputs, for example. In yet a further embodiment, a second wavelength-selective filter is placed between the refractive element and the optical outputs. Another fiber provides a light signal to be added to the input light signal at the wavelengths of the dropped channel(s), thus providing an ADD/DROP function with high isolation when combined with the reflected portion of the input light signal. The use of a thin wedge can provide close proximity between an input and output flashlight, resulting in little walk-off between light beam paths and low insertion loss.

DETAILED DESCRIPTION OF THE INVENTION

I. Introduction

The present invention provides an optical switch with reduced sensitivity to mis-alignment, shock, and vibration. A refractive optical element, such as an optical wedge, is moved from one position to another to direct a light signal from an input waveguide to a selected output waveguide. The deflection angle of the light signal beam exiting the refractive optical element is less sensitive to variations in the tilt angle of the refractive optical element than would be the deflection angle of a mirror, for example, having a similar deviation in tilt angle. In a particular embodiment, an optical wedge presents a near-parallel-faced portion of the wedge to an input light beam in a first switch position, and an angle-faced portion in a second switch position. The near-parallel-faced portion transmits the light beam to a first output waveguide with minimal refraction, and the angle-faced portion refracts the light beam to a second output waveguide. A slight angle is typically desired between the incident light beam and the surface of the optical wedge to minimize or eliminate back reflections off the surface of the wedge to the input fiber. Those skilled in the art will appreciate that substantial refraction of the light beam can occur in both positions, and that both portions of the wedge could be angled. Similarly, a wedge with multiple portions on the second surface could be used.

The optical wedge can be mounted on a variety of switch mechanisms to achieve a signal switching function. For example, the optical wedge could be mounted on a hinged arm that swings the wedge in a plane to intersect the input light beam at the different regions of the wedge. In another configuration, the optical wedge could be mounted on an armature that rotates about a pivot axis to move the wedge from one position to another. The switch mechanisms can be actuated by a variety of motive devices, such as solenoids or piezoelectric actuators. One suitable mechanism is described in co-pending, co-assigned U.S. patent application Ser. No. 09/454,022 entitled OPTICAL SWITCH WITH FLEXURE PIVOT by Ian Seddon, filed Dec. 3, 1999, now U.S. Pat. No. 6,275,624 the disclosure of which is herein incorporated for all purposes. Other mechanisms will be apparent to those skilled in the art, such as sliding mechanisms.

II. Optical Switch with Reflective Switched Element

Figure 1A:
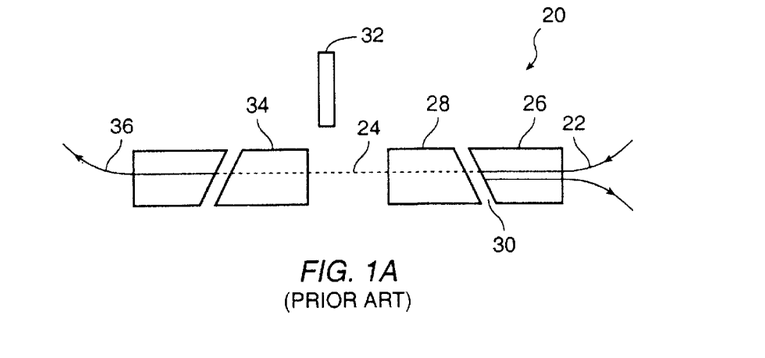
FIGS. 1A and 1B are simplified schematics of a conventional optical switch using a reflective switch element.

FIG. 1A is a simplified schematic of a conventional optical switch 20. An input optical fiber 22 provides a light signal, represented by the dotted line 24. The optical fiber is generally held in place in a ferrule 26 that is aligned to a collimator 28, such as a graded-index ("GRIN") lens. The GRIN lens is typically a little less than ¼ pitch, and the ferrule-fiber assembly and GRIN lens are typically angle-lapped, as indicated by the gap 30 to reduce reflections between the GRIN lens and the end of the optical fiber. The ferrule 26 and collimator 28 are typically fabricated as a unit commonly referred to as a "flashlight" by cementing the parts together in a capillary tube (not shown) or otherwise fixing them in a generally co-axial fashion. The gap allows some adjustment of the fiber end, i.e. focusing, with respect to the collimator for focusing prior to fixing the positions of the elements. A mirror 32 is in a first switch position so that it does not reflect the light signal, and the light signal continues through a second collimator 34 to a first output optical fiber 36.

Figure 1B:
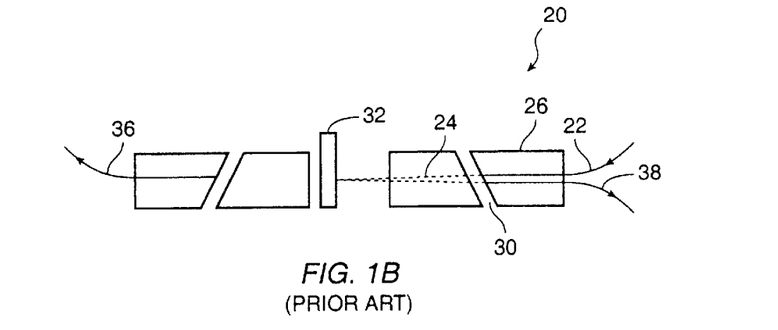

FIG. 1B shows the mirror 32 in a second switch position where the mirror reflects the light signal to a second output optical fiber 38. The second output optical fiber is mounted in the same ferrule 26 as the input optical fiber. The position of the mirror, collimators, and fiber ends, as fixed by the ferrules, are chosen to align the elements in each of the selected switch position. The fibers in a ferrule are shown with exaggerated separation for purposes of illustration.

Typically, the fibers are fixed in a center bore of the ferrule, the center bore being about twice the diameter (for a 2-fiber configuration) of a fiber, which is about 125 microns. Thus, the separation between the centers of the optical axis of the fibers is about 125 microns. The core of the optical fiber is typically about 10 microns or less. The alignment of the optical elements is important and generally requires a great deal of precision due to the relatively small dimensions of the fiber ends. However, a change in the tilt angle of the mirror can result in an increased error in the direction of the reflected beam, thus changing the light signal incident on the output fiber end.

III. Comparison of Beam Deflection for Reflective and Refractive Elements

Figure 2A:
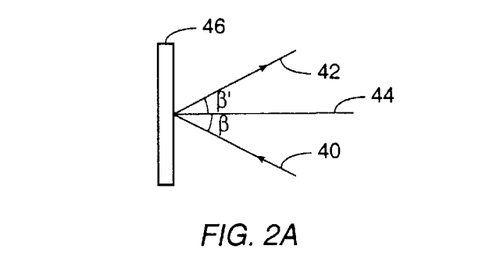
FIGS. 2A and 2B are simplified drawings illustrating the relationship between tilt angle and deflection angle for a mirror and a wedge.

FIG. 2A is a simplified illustration of the relationship between an incident beam 40 and a reflected beam 42. The incident light beam forms an incident angle β with a normal axis 44 of a mirror 46. The light beam is reflected, as represented by the reflected beam 42, at a reciprocal angle β'. The incident angle could be intentional, such as for alignment of the mirror to reflect the light beam to a selected position, or could be unintentional, such as due to alignment error, vibration of the mirror with respect to the input beam, thermal expansion effects, or the like. For a mirror, the incident angle is generally equal to the reciprocal angle. This means that any error in the incident angle results in a similar deflection of the reflected beam, essentially doubling the difference in the angle formed between the input beam and the reflected beam.

Figure 2B:
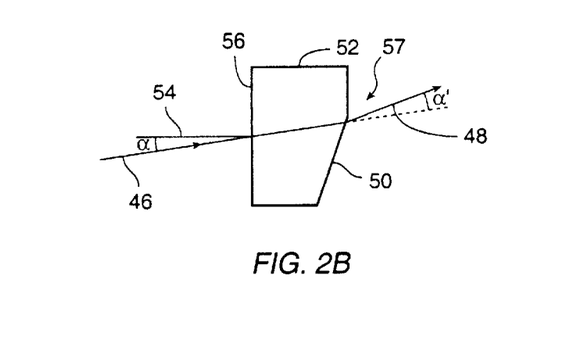

FIG. 2B is a simplified illustration of the relationship between an incident beam 46 and a refracted beam 48 transmitted through an angle-faced portion 50 of an optical wedge 52. The incident light beam 46 forms an incident angle α with a normal 54 to a first face 56 of the wedge 52. The light beam is refracted at the first face, and transmitted to an angled portion 50 of a second face of the optical wedge. In a preferred embodiment, the light beam is essentially perpendicular to the surface of the optical wedge, forming an angle of about 0.5 degrees with the surface of the optical wedge to reduce back reflections.

A preferred method of manufacture is to lap the angled portion to an angle between about 6–8 degrees, depending on the desired direction of refraction, which is a function of the distance between the output optical fibers. Deviation of the tilt angle of the optical wedge face may occur due to alignment error, mechanical shock, vibration, thermal expansion effects and the like. The light beam is again refracted upon leaving the second face of the wedge at an exit angle α'.

FIG. 2B shows the beam exiting through the angled portion. Alternatively, the beam could exit through the parallel portion of the second face of the wedge. In this configuration (i.e. switch position), the beam would be transmitted through the wedge with refraction angles of essentially zero degrees. In other words, the beam would go essentially "straight" through the wedge. Any internal reflections that occur within the optical wedge are incidental and, although add to the overall insertion loss of the device, can otherwise generally be ignored. Reflections between the ambient air and the optical wedge can be reduced by applying an anti-reflection coating on one or both transmissive surfaces of the optical wedge.

Figure 2C:
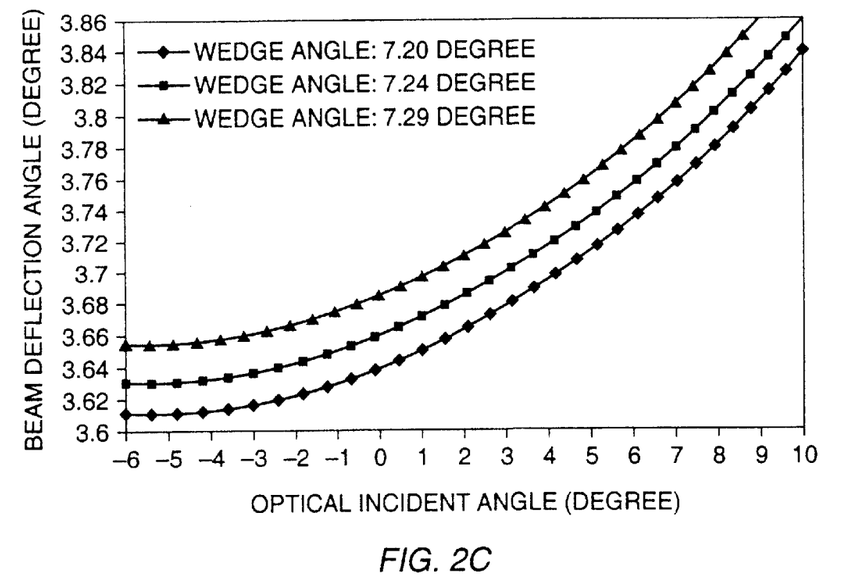
FIGS. 2C is a graph illustrating beam deflection angle versus incident angle for various optical wedge angles.

FIG. 2C is a graph illustrating the predicted beam deflection angle versus tilt angle (with respect to the incident light beam) for different wedge angles. The wedge angle is defined as the angle formed between an extension of the parallel portion of the second face and the angled portion, as further discussed in reference to FIG. 4. FIG. 2C illustrates that the beam deflection angle is much less than a deviation in tilt angle. For example, given a wedge angle of 7.29 degrees, if the tilt angle varies from −1 to +1 degrees, the beam deflection angle only changes 0.02 degrees. This allows easier alignment between the input flashlight, the optical wedge, and the output flashlight, compared to a reflective optic element.

Figure 2D:
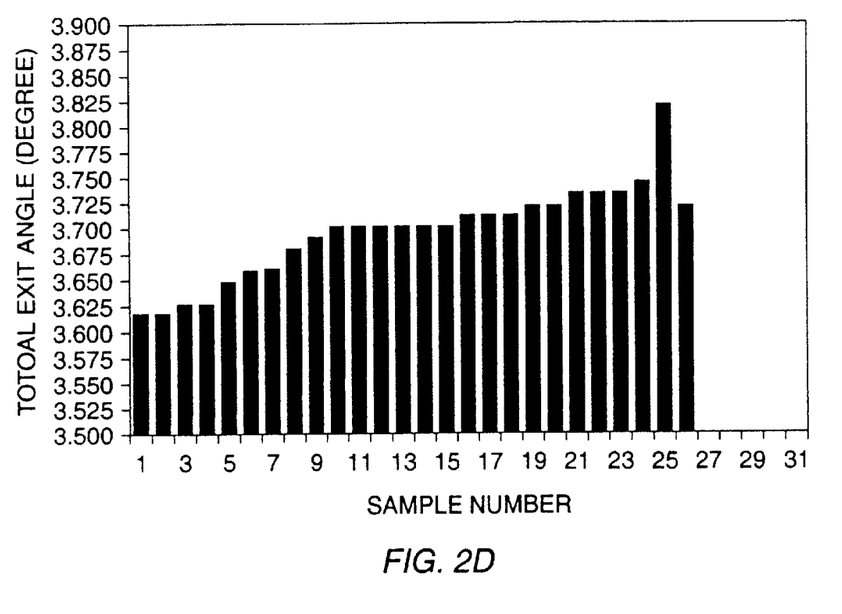
FIG. 2D is a chart illustrating the distribution of exit angles for samples of dual fiber optical collimators.

FIG. 2D shows the experimental distribution of the total exit angle for 26 samples of dual fiber collimators built using 26 different 0.25 pitch GRIN lenses and measured at a test wavelength of 1550 nm. Thus, the data shows the cumulative effect of the GRIN lens and alignment error of fibers (ferrules) for 26 samples. Sample number 25 is believed to be an anomaly in either sample preparation and/or measurement process. This distribution shows the desirable manufacturability of making optic switches using optical wedges.

IV. Example of Optical Wedge Switch

Figure 3A:
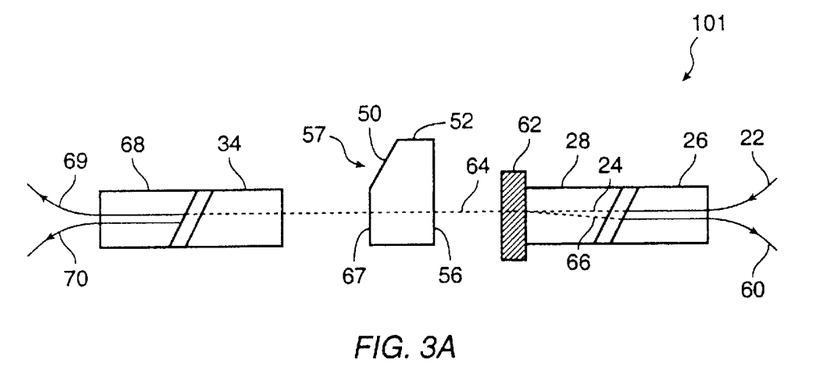
FIGS. 3A and 3B are simplified schematics of an optical switch according to an embodiment of the present invention in two switch positions.
Figure 3B:
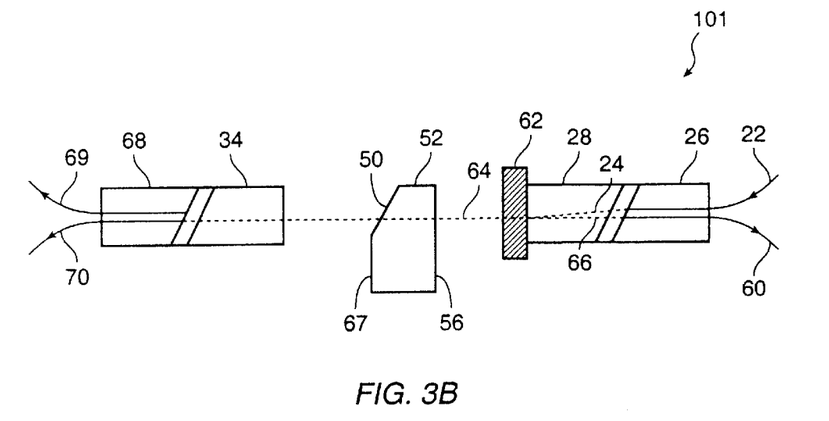

FIGS. 3A and 3B are simplified schematics illustrating the operation of an optical switch 101 according to an embodiment of the present invention. This particular embodiment is known as an "in line" embodiment, and provides a compact switch design. FIG. 3A shows a switched refractive element, which in this embodiment is an optical wedge 52 in a first position. An input optical fiber 22 and an "express" optical fiber 60 are mounted in a ferrule 26. The ferrule 26 is angle-lapped and optically coupled to a GRIN lens 28 or other collimator. A filter 62 is mounted on the end of the GRIN lens 28. The filter typically selects a channel or channels from multiple channels present on the input beam 24, and transmits that selected channel(s) to the switched refractive element. A typical current dense wavelength division multiplexed ("DWDM") optical communication system might have a defined channel separation of 100 GHz, and the filter is generally centered about the nominal channel wavelength with a 3 dB filter width of less than 100 GHz, for example about 40–50 GHz. It is understood that the preceding numerical examples are not limiting, but are given for purposes of illustration only, and that the filter may be designed for different channel spacings, and may be wider or narrower as circumstances dictate. In one embodiment, the filter is an alternating series of thin film dielectric materials, commonly known as a "dielectric stack". Such a filter transmits the selected wavelengths and efficiently reflects the remaining ("express") wavelengths.

The express light beam 66, which generally includes the remainder of the input light beam (channels) not transmitted through the filter 62 is reflected by the filter to the express fiber 60. Typically, the express fiber and the input fiber are equally offset from the center axis of the ferrule (and collimator), allowing the major plane of the dielectric stack of the filter to be mounted normal to the center axis of the collimator.

The portion of the input beam transmitted by the filter will be called the "DROP" channel(s) or beam for purposes of discussion, because it is dropped from the input signal. The DROP beam 64 is incident on a first face 56 of the optical wedge 52. In this first position, the DROP beam is transmitted through the optical wedge to a parallel portion 67 of a second face 57 of the optical wedge. The DROP beam exits the optical wedge with minimal deflection angle and enters a second collimator 34 to be focused on a first output fiber 69. The first output fiber is mounted in a second ferrule 68 with a second output fiber 70. The first and second output fibers are configured to convey the DROP channel to different destinations, selected by the operation of the switch.

FIG. 3B shows the optical wedge 52 in a second position. The DROP beam 64 enters the first face 56 of the optical wedge, but in this switch position is transmitted to an angled portion 50 of the second face 57 of the optical wedge. When the DROP beam exits the angled face, it is refracted to the second output fiber 70. The angle of the third face is generally chosen according to the distance of separation between the centers of the first and second output fibers when using a GRIN lens. It is specifically understood that the filter and express fiber are optional, and that the switch could switch the entire input beam between selected output paths. Similarly, it is understood that the operation of a switch according to the present invention could be configured to add, rather than drop, a channel or channels from a multi-channel optic signal.

V. Further Details of an Optical Wedge

Figure 4:
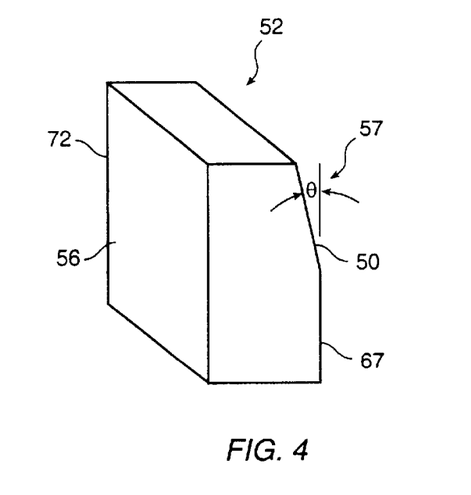
FIG. 4 is a simplified perspective view of an exemplary optical wedge.

FIG. 4 is a simplified perspective view of an optical wedge suitable for use in embodiments of the present invention. The optical wedge is preferably made of optical glass, and is designed for a nominal wavelength of 1550 nm. An anti-reflective ("AR") coating is deposited on the first 56 and second 57 surfaces (both the angled and parallel portions), which are essentially scratch free with a flatness of λ/4 at 632.8 nm. The AR coating is designed to have a reflectance less than 0.25% at 1550±20 nm. A wedge angle θ is 7.29 degrees for a particular output fiber spacing, with a tolerance of ±1 minute (about 0.02 degree). The wedge is about 1.25 mm thick between the first surface and the parallel portion of the second surface, about 2.50 mm long (i.e. the length edge 72). The wedge is about 2.00 mm high, and the parallel portion 67 of the second surface 57 is about 1.25 mm wide. It is understood that the above material and dimensions are exemplary only, and that other optical wedges or refractive elements could be used according to the present invention. In particular, a thinner optical wedge is desirable in some embodiments, and wedges have been made that are about 0.5 mm thick, as further discussed in reference to FIG. 7, below.

VI. Use of an Optical Wedge Switch in an ADD/DROP Device

Figure 5:
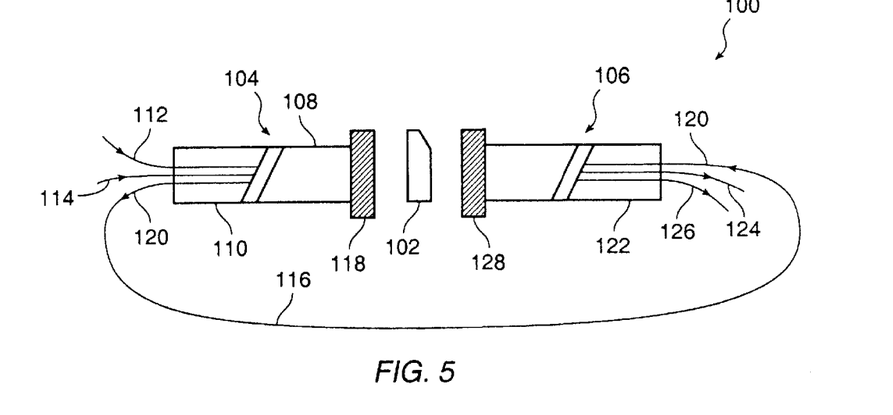
FIG. 5 is a simplified diagram of an embodiment of the present invention configured as a 2×2 ADD/DROP node.

FIG. 5 is a simplified diagram of an embodiment of the present invention configured as an ADD/DROP node. In a DWDM optical fiber transmission system it is often desirable to drop the data (information) carried on a channel(s) at a node and add new data (such as multiplexed video, digital, or voice data) on that channel, thus maintaining efficient use of the bandwidth provided by the fiber optic network while maintaining high isolation between the added and dropped channels. In this example, as above, it is understood that "input" and "output" are used for convenient discussion, and that a particular configuration of the switch and associated optical fiber network might have optical signals flowing in either or both directions. FIG. 5 is a simplified representation of a compact ADD/DROP node (switch) 100. A switchable refractive element 102 is positioned between a first flashlight 104 and a second flashlight 106. The first flashlight 104 includes a GRIN lens 108 or other collimator coupled to a ferrule 110. The ferrule supports the position of three optical fibers 112, 114, 116 in relation to the GRIN lens. The three optical fibers include an input fiber 112, an ADD fiber 114, and an express fiber 116. A filter, which will be referred to as a "channel filter" (e.g. a DWDM filter) is configured to transmit a selected channel(s) to the refractive element 102, and to reflect the remainder of the input light beam from the input fiber 112 to the express fiber 116. As represented by the arrow 120, the express fiber conveys the input signal or its remainder to the second flashlight 106. It is understood that the input light beam may not include the channel(s) relevant to a particular node (channel filter), in which case the filter would reflect the entire input light beam, and that the ADD/DROP node could be operated in either an ADD mode or a DROP mode in certain configurations, or at certain times.

The second flashlight includes a second ferrule 122 that contains the express fiber 116, a DROP fiber 124, and an output fiber 126. The output fiber is configured to optically couple to the express signal reflected off a second channel filter 128, as well as the ADD light beam from the ADD fiber 114, as will be further understood in light of the description associated with FIGS. 6B, 6C, 7, and 8A and 8B. The first and second channel filters typically have similar optical characteristics, i.e. they each pass the same channel frequencies and reflect the express frequencies.

Figure 6A:
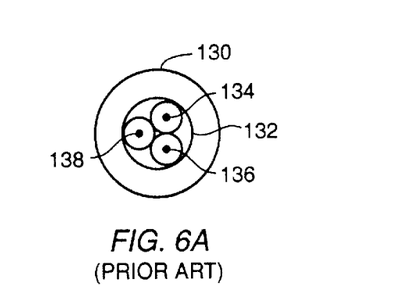
FIGS. 6A–6C are simplified end views of ferrules containing multiple fibers offset from a center axis of the ferrule.

FIG. 6A is a simplified end view of a conventional 3-fiber ferrule 130. A round hole capillary 132 of appropriate diameter is formed about the center of the ferrule. This offsets the three optical fibers 134, 136, 138 equally from the center axis of the ferrule. When assembling a GRIN lens-ferrule assembly for an ADD/DROP module, typically two of the three fibers are aligned with the center of the GRIN lens, the third fiber being slightly offset. This causes the distance between the center axis of the GRIN lens and the optical axis of the third fiber to be different from the distance between the center axis of the GRIN lens and the other two fibers. Although the distance is slight, this results in a center wavelength shift between the DROP channel and the ADD channel.

Figure 6B:
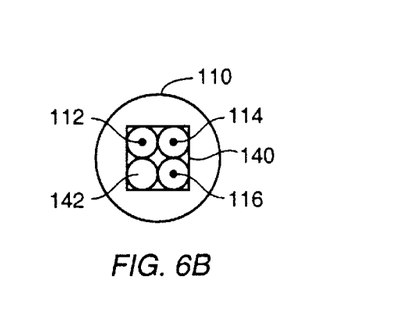

FIG. 6B is a simplified end view of a 3-fiber ferrule according to an embodiment of the present invention. For purposes of discussion, a "3-fiber" ferrule refers to a ferrule intended to couple 3 optical fibers to an optical device, such as a GRIN lens. A square capillary 140 has been formed about the center of the ferrule 110. The capillary contains three active optical fibers 112, 114, 116 and a "dummy" optical fiber 142. The dummy optical fiber is not configured to carry optical signals, but acts as a mechanical spacer to hold the three active fibers in a desired relationship to the optical axis of the collimator. In reference to FIG. 5 above and FIGS. 7, 8A, and 8B, below, the first optical fiber 112 is the input fiber, the second optical fiber 114 is the ADD fiber, and the third optical fiber 116 is the express "output". In this configuration, the center of a line between the center of fiber one 112 and the center of fiber three 116 is aligned with the axis of the GRIN lens. This alignment positions all three fibers an equal distance from the center axis of the GRIN lens, thus all three fibers have the same incident angle relative to the channel (DWDM) filter, and center frequency shift is avoided between the add and drop channels.

Figure 6C:
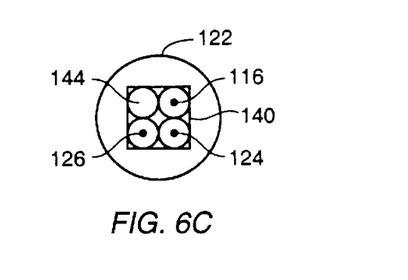

FIG. 6C is a simplified end view of a 3-fiber ferrule according to an embodiment of the present invention that is complimentary to the ferrule shown in FIG. 6B. The first optical fiber 116 is the express "input" to the second flashlight shown in FIG. 5. The second optical fiber 124 is the DROP fiber, and the third optical fiber 126 is the output fiber. The fourth fiber 144 is a dummy fiber.

Figure 7:
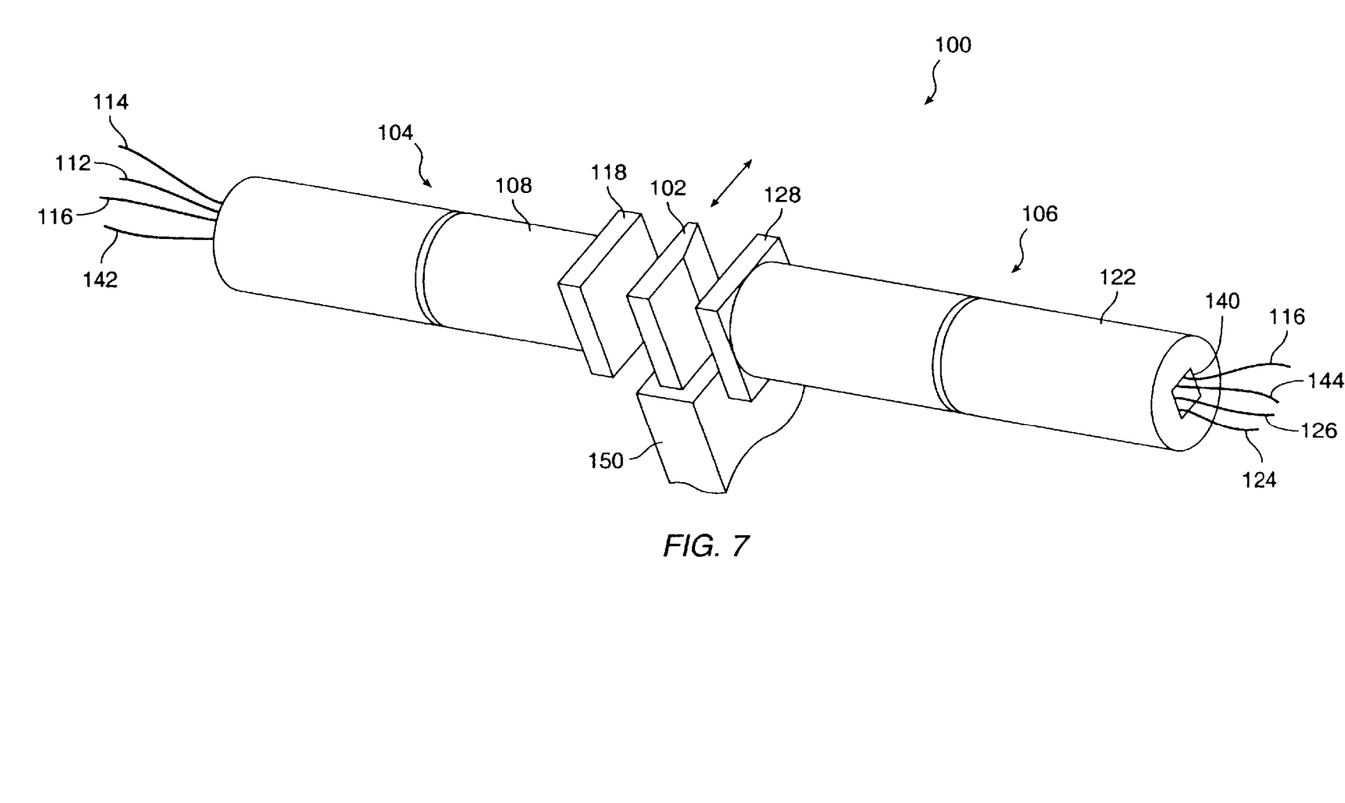
FIG. 7 is a simplified perspective view of the 2×2 ADD/DROP node shown in FIG. 5.

FIG. 7 is a simplified perspective view of a 2×2 ADD/DROP node (switch assembly) 100. The first flashlight 104 is coupled to the first channel (DWDM) filter 118. An optical wedge 102 is mounted on a hinged beam, armature, or other structure 150 to selectively switch between first and second switch positions. The second flashlight 106 is coupled to the second channel filter. This configuration is particularly desirable for reducing the alignment sensitivity of the switched optical element, reducing the size of the ADD/DROP hybrid module, and insertion loss of the ADD/DROP channel through the switch assembly. The insertion loss is related to the distance between the GRIN lenses, among other factors. In an embodiment of the present invention, the separation between GRIN lenses is mainly determined by the thicknesses of the channel filters (typically about 0.5mm), the thickness of the optical wedge (typically about 0.5 mm), and gap(s) between the optical wedge and the channel filter(s) (typically about 0.1 mm). The total equivalent separation distance (appx. (2×0.5+0.5)/refractive index of glass+(2× 0.1)≈1.2 mm) results in an expected excess loss less than 1 dB for a switch built according to these dimensions.

Figure 8A:
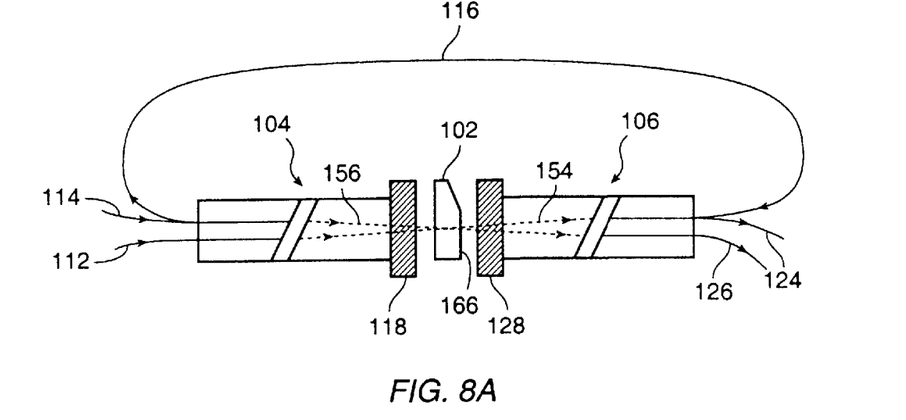
FIGS. 8A and 8B are simplified top-view schematic representations of a 2×2 ADD/DROP switch in each of two switch positions.

FIG. 8A is a simplified top view schematic representation of a 2×2 ADD/DROP switch in a position where the "parallel" portion 166 of the optical wedge 102 is in the light signal path between the first 104 and second 106 flashlights. In this switch position, the DROP channel 154 transmitted from the first channel filter 118 is coupled into the DROP fiber 124 of the second flashlight 106. The ADD channel 156 from the first flashlight 104 is coupled to the output fiber 126 of the second flashlight 106. Also, the express channels from the input fiber are reflected off the first filter 118 into the express fiber 116 in the first flashlight 104. The express fiber loops to the second flashlight 106, where the express channels are reflected off of the second filter 128 into the output fiber 126. In this fashion, an ADD/DROP function is achieved with minimal degradation of the optical signal passed from the input fiber to the output fiber and high isolation between the added and dropped optical signals. Illustration of the express beams are omitted from FIGS. 8A and 8B for clarity of illustrating the ADD/DROP beams.

Figure 8B:
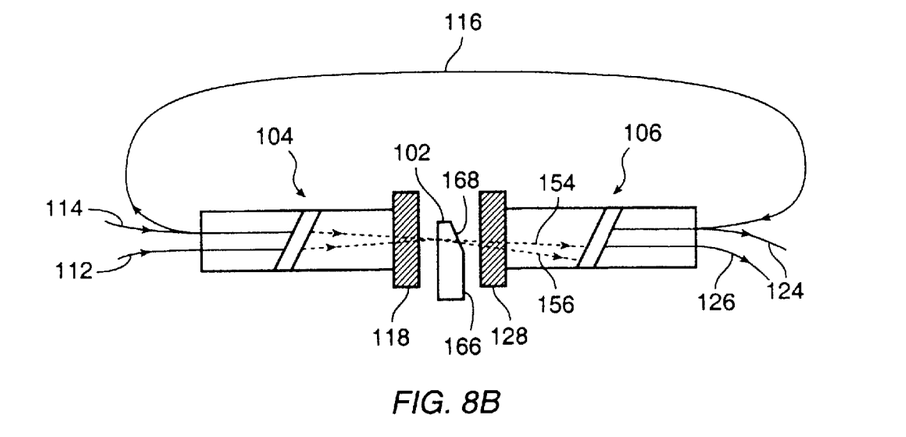

FIG. 8B is a simplified top view schematic representation of a 2×2 ADD/DROP switch in a position where the "angled" portion 168 of the optical wedge 102 is in the light signal path between the first 104 and second 106 flashlights. The DROP channel 1 54 passed thru the first filter 118 is refracted in a selected direction so that it couples into the output fiber 126 of the second flashlight. The ADD channel 156, if any, is essentially terminated by focusing it so that it does not optically couple to the output fiber 126. This combines the DROP channel from the first flashlight back into the output with minimal signal degradation. Additionally, all express channels are coupled to the output, as described above in reference to FIG. 8A. Hence, all channels are passed to the output with minimal signal degradation.

Express channel signal strength is maintained, among other ways, by using a relatively short optical fiber segment for the express loop. In a preferred embodiment, this optical fiber segment is integrated with the other elements of the optic switch and contained within a package of the optic switch.

While the description above provides a full and complete disclosure of the preferred embodiments of the present invention, various modifications, alternatives, and equivalents will be obvious to those of skill in the art. For example, while embodiments of the invention have been described with reference to optical fiber transmission lines, other types of transmission lines could be used. Similarly, the channel filters have been shown as attached to the ends of the collimators, but filters could be otherwise mounted or integrated with the collimators. Accordingly, the scope of the invention is limited solely by the following claims.

What is claimed is:

1. An optical switch comprising:
   an optical input (22) configured to provide an optical signal;
   an optical element (52) mounted on a selectively movable switch mechanism, the optical element having a first portion and a second portion, the first portion capable of being disposed in a first switch position to transmit a light signal from the optical input in a first direction through the optical element without significant refraction or internal reflection of the light signal in the optical element and the second portion capable of being disposed in a second switch position to refract the light signal, without internal reflection of the light signal in the optical element, in a second direction, the optical element being disposed between the optical input and
   an optical output (69), wherein the optical element is selectively switchable between the first switch position and the second switch position, the first switch position directing the optical signal to optically couple with the optical output and the second switch position refracting the optical signal to not optically couple with the optical output.

2. The optical switch of claim 1 wherein the optical element is an optical wedge.

3. The optical switch of claim 2 wherein the optical wedge includes a a first face (56) and a second face (57), the second face having a first portion (67) parallel to the first face and a second portion (50) angled to the first portion.

4. The optical switch of claim 3 wherein the second portion of the second face forms an angle of between about 6–8 degrees with the first portion of the second face.

5. The optical switch of claim 1 wherein the light signal enters the optical element at an essentially normal angle.

6. The optical switch of claim 1 further comprising a second optical output (70), the second switch position disposing the optical element to refract the light signal to optically couple to the second optical output.

7. The optical switch of claim 1 further comprising an optical port and a first wavelength-selective filter (118) disposed between the optical input and the optical element, the wavelength selective filter transmitting a first portion of the optical signal to optically couple the first portion of the optical signal to the refractive optical element, and reflecting a remaining portion of the optical signal to the optical port.

8. The optical switch of claim 7 further comprising a second wavelength selective filter (128) disposed between the optical element and the optical output.

9. An optical switch comprising:
   a first optical fiber mounted in a first ferrule;
   a second optical fiber mounted in the first ferrule;
   a third optical fiber mounted in a second ferrule;
   a fourth optical fiber mounted in the second ferrule;
   an optical wedge disposed between the first ferrule and the second ferrule, the optical wedge being mechanically coupled to a switch mechanism capable of switching the optical wedge between a first switch position and a second switch position, the optical wedge having a first face and a second face opposite the first face, the second face having a first portion essentially parallel to the first face and a second portion forming a non-parallel angle to the first face;
   a first wavelength selective filter disposed between the first optical fiber and the optical wedge, the wavelength selective filter transmitting a selected portion of an optical signal form the first optical fiber to the optical wedge and reflecting a remaining portion of the optical signal to the second optical fiber, wherein the optical wedge transmits the selected portion of the optical signal to optically couple to
   a second wavelength selective filter disposed between the optical wedge and the third optical fiber when the optical wedge is in the first switch position, and refracts the light signal to optically couple the selected portion of the optical signal to the fourth optical fiber when the optical wedge is in the second switch position,
   the first face and the second face being of such shape and the optical wedge being disposed such that the light signal when incident on the optical wedge undergoes a transmission through the wedge free of internal reflection therein.

10. The optical switch of claim 9 wherein the non-parallel angle is between about 6–8 degrees from the first portion of the second face.

11. The optical switch of claim 9 wherein the first ferrule has a first center axis and the second ferrule has a second center axis, the first center axis being essentially co-linear with the second center axis, the first face of the optical wedge being essentially normal to the first center axis.

12. An optical switch comprising:
   a first flashlight (104) including
      a first optical fiber (112),
      a second optical fiber (114), and
      a first end of a third optical fiber (116);
   a second flashlight (106) including
      a fourth optical fiber (124),
      a fifth optical fiber (126), and
      a second end of the third optical fiber;
   a first wavelength selective filter (118) disposed between the first flashlight and
   a switchable refractive optical element (102) having a first portion and a second portion, the first portion capable of being disposed in a first switch position to transmit a light signal from the optical input in a first direction without significant refraction Or internal reflection of the light signal, and the second portion capable of being disposed in a second switch position to refract the light signal in a second direction without internal reflection of the light signal, and a second wavelength selective filter (128) disposed between the switchable refractive optical element and the second flashlight, the switchable refractive optical element being selectively switchable between at least a fist position and a second position to optically couple an input signal from the first optical fiber to one of the fourth optical fibert and the fifth optical fiber.

13. The optical of claim 12 further comprising a package, the package including at least the first wavelength selective filter, the second wavelength filter, the switchable refractive optical element, and the third fiber.

* * * * *